(12) United States Patent
Shim

(10) Patent No.: US 11,698,450 B2
(45) Date of Patent: Jul. 11, 2023

(54) DEVICE AND METHOD FOR REDUCING NOISE OF EXTERNAL MEASUREMENT SENSOR OF MOBILITY

(71) Applicant: HYUNDAI MOBIS CO., LTD., Seoul (KR)

(72) Inventor: Yeon Joo Shim, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/664,368

(22) Filed: May 20, 2022

(65) Prior Publication Data

US 2023/0168355 A1 Jun. 1, 2023

(30) Foreign Application Priority Data

Dec. 1, 2021 (KR) .......................... 10-2021-0170126

(51) Int. Cl.
| | | |
|---|---|---|
| *G01S 7/527* | (2006.01) | |
| *G01S 7/536* | (2006.01) | |
| *G01S 15/93* | (2020.01) | |
| *G01S 15/931* | (2020.01) | |

(52) U.S. Cl.
CPC ............ *G01S 7/5273* (2013.01); *G01S 7/536* (2013.01); *G01S 15/931* (2013.01)

(58) Field of Classification Search
CPC ...... G01S 7/5273; G01S 7/536; G01S 15/931; B60W 2540/10; B60W 2540/12; B60W 2540/18; B60W 2540/22; B60W 2540/28; G05D 1/0255; G05D 1/0257

See application file for complete search history.

(56) References Cited

U.S. PATENT DOCUMENTS

| | | | |
|---|---|---|---|
| 2010/0019949 A1 | 1/2010 | Larocque et al. | |
| 2015/0328985 A1* | 11/2015 | Kim ....................... | G08B 21/06 |
| | | | 180/272 |
| 2018/0268695 A1* | 9/2018 | Agnew ................ | B60K 28/066 |

FOREIGN PATENT DOCUMENTS

| | | |
|---|---|---|
| DE | 10 2016 218064 | 3/2018 |
| EP | 2 148 219 | 1/2010 |
| KR | 2020-0076967 | 6/2020 |
| WO | WO 2015/090849 | 6/2015 |

OTHER PUBLICATIONS

Extended European Search Report dated Nov. 16, 2022 issued in EP 22178106.5.

* cited by examiner

*Primary Examiner* — Daniel L Murphy
*Assistant Examiner* — Amie M Ndure
(74) *Attorney, Agent, or Firm* — DLA Piper LLP (US)

(57) ABSTRACT

A device and method for reducing noise of an external measurement sensor of mobility, including a storage unit that stores measurement values of an external measurement sensor of mobility including an ultrasonic sensor measuring distance values between the mobility and an object outside the mobility; and an operation unit that generates a plurality of functions capable of being derived from the measurement values stored in the storage unit, derives a final function having the most measurement values within a first range, among the plurality of functions, derives an estimated value that is an expected value of the measurement value through the final function, and selects a candidate final value that is the closest to the estimated value within a second range, among actual measurement values at a time point corresponding to the estimated value, as a final value.

18 Claims, 4 Drawing Sheets

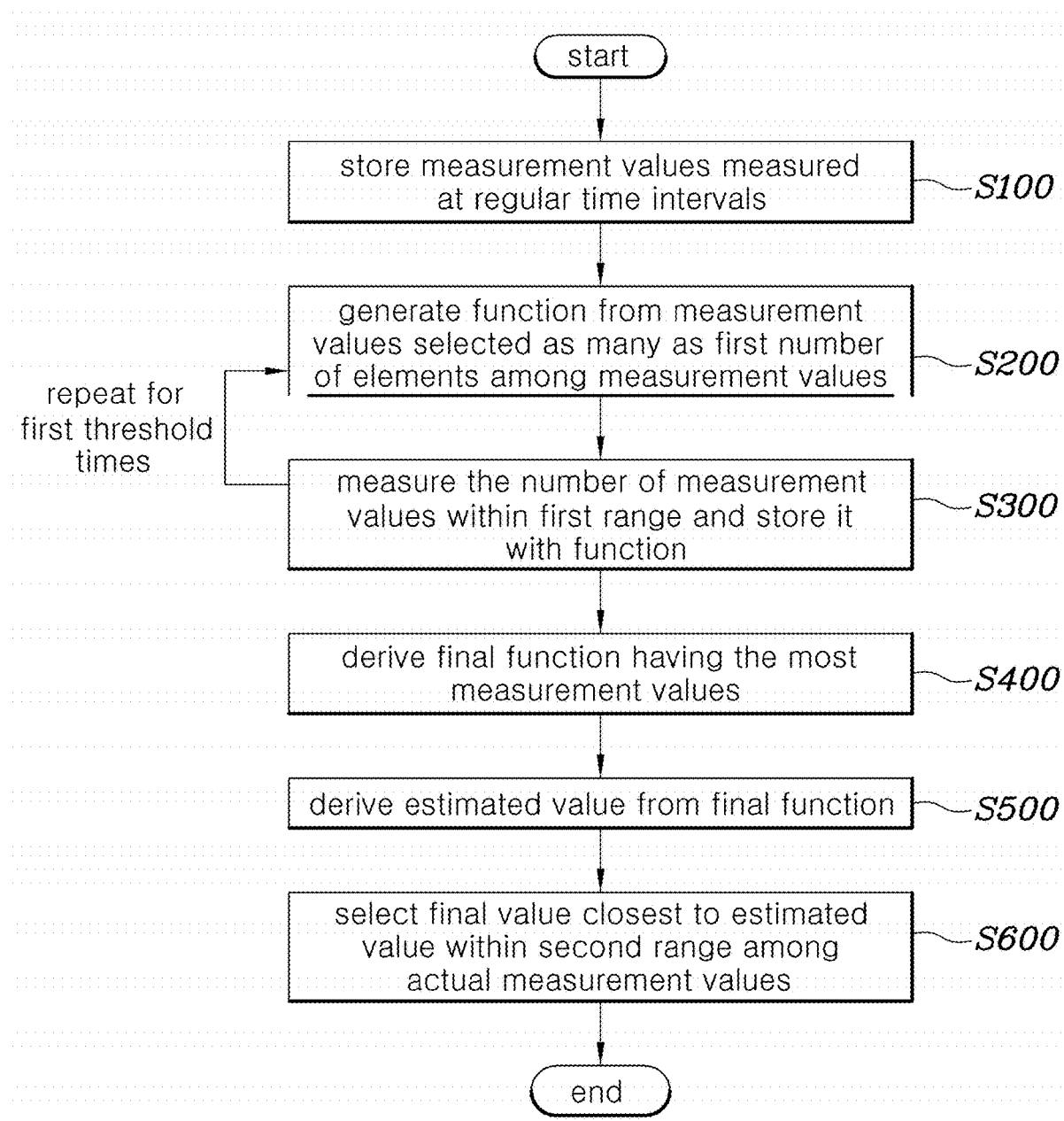

DEVICE AND METHOD FOR REDUCING NOISE OF EXTERNAL MEASUREMENT SENSOR OF MOBILITY

CROSS REFERENCE TO RELATED APPLICATION

The present application claims priority to Korean Patent Application No. 10-2021-0170126, filed Dec. 1, 2021, the entire contents of which is incorporated herein for all purposes by this reference.

BACKGROUND OF THE INVENTION

Field of the Invention

The present invention relates to a device and method for reducing noise of an external measurement sensor of mobility which additionally utilize past data to reduce the noise of measured current data in measuring the external data of mobility, and at this time, can output robust current data to an abnormal signal by using the function obtained from the past data measured for a certain time immediately before and the range of the function, and can effectively control a collision warning or braking device of mobility by using this.

Description of the Related Art

An external measurement sensor such as an ultrasonic sensor of mobility, a means of transportation such as a vehicle, is used for collision warning or braking by detecting objects in a vehicle system. A conventional ultrasonic sensor detects a relative distance from an object by emitting an ultrasonic signal (transmission wave) and determining whether the intensity of a signal (received wave) reflected from the object exceeds a specific threshold. Then, the conventional ultrasonic sensor system outputs the closest distance value in which the intensity of the received signal is greater than or equal to a threshold. Then, if the output distance value is less than a certain distance, a collision warning system or an emergency braking system is controlled to be operated. Therefore, in an actual vehicle environment in which various noises having frequencies similar to that of the transmission wave exist, there is a risk of outputting an incorrect distance value if a noise signal exceeding the threshold is simultaneously received with the received wave. Therefore, there is a need for filing the conventional noise for robust control to abnormal signals by removing various noises.

In particular, a least mean square method is disclosed as a method of predicting current data based on the past data measured by an ultrasonic sensor. However, there is a fatal problem that the current data may be incorrectly predicted if the abnormal signals of past data are included. Therefore, there is a need for a technique to solve this problem.

The matters described as the background technology of the present invention are only for improving the understanding of the background of the present invention, and should not be taken as acknowledging that they correspond to the prior art already known to those of ordinary skill in the art.

SUMMARY OF THE INVENTION

The present invention is proposed to solve the above problem and an object of the present invention is to provide a device and method for reducing noise of an external measurement sensor of mobility which additionally utilize past data to reduce the noise of measured current data in measuring the external data of mobility, and at this time, can output robust current data to an abnormal signal by using the function obtained from the past data measured for a certain time immediately before and the range of the function, and can effectively control a collision warning or braking device of mobility by using this.

A device for reducing noise of an external measurement sensor of mobility according to the present invention includes a storage unit that stores measurement values of an external measurement sensor of mobility including an ultrasonic sensor measuring distance values between the mobility and an object outside the mobility; and an operation unit that generates a plurality of functions capable of being derived from the measurement values stored in the storage unit, derives a final function having the most measurement values within a first range, among the plurality of functions, derives an estimated value that is an expected value of the measurement value through the final function, and selects a candidate final value that is the closest to the estimated value within a second range, among actual measurement values at a time point corresponding to the estimated value, as a final value.

The storage unit may store the measurement values of the external measurement sensor of mobility measured at regular time intervals.

The operation unit may select the measurement values as many as a first number of elements among the stored measurement values and may generate the plurality of functions capable of being derived from the selected measurement values.

The operation unit may select two measurement values among the stored measurement values and may generate a plurality of linear functions capable of being derived from the selected measurement values.

The operation unit may not generate the plurality of functions any more if the number of functions generated is greater than or equal to a first threshold times.

The operation unit may not generate the plurality of functions from the measurement values if one or more of selected measurement values include zero (0).

The operation unit may not generate the plurality of functions from the measurement values if an absolute value of a slope of the function derived from any two measurement values among selected measurement values is greater than or equal to a first threshold.

The operation unit may exclude the function in which the number of measurement values is less than a first threshold, among the plurality of functions, from the final function, and may derive the final function having the most measurement values, among the functions in which the number of measurement values is greater than or equal to the first threshold.

The operation unit may not derive the estimated value if there is no function in which the number of measurement values within the first range is greater than or equal to a second threshold, among the plurality of functions.

If there is a plurality of the final functions, the operation unit may derive the function having the largest sum of values obtained by multiplying the measurement value within the first range by a first weight that increases as the measurement value is closer to a current time point, as the final function.

The first weight may be the number of measurement values within the first range in a case of the measurement value closest to the current time point, and the first weight may be one (1) in a case of the measurement value farthest from the current time point.

If there is a plurality of final functions, the operation unit may derive the function having the smallest sum of squares of residual between the measurement value and the corresponding function value as the final function.

If there is a plurality of final functions, the operation unit may derive the function having the largest sum of values obtained by multiplying the measurement value within the first range by a first weight that increases as the measurement value is closer to a current time point, as the final function, and if the sum is the same, the operation unit may derive the function having the smallest sum of squares of residual between the measurement value and the corresponding function value, as the final function.

If there is an approximate final value that is an actual measurement value whose residual from the candidate final value is greater than or equal to a third threshold at the time point corresponding to the estimated value, the operation unit may select the approximate final value as the final value.

If there is the approximate final value whose residual from the candidate final value is greater than or equal to the third threshold, and at the same time, there is a second approximate final value that is the measurement value whose residual from a second candidate final value is greater than or equal to the third threshold, the second candidate final value being the measurement value closest within the second range to the estimated value at the time point immediately before the time point corresponding to the estimated value, among the actual measurement values at the time point immediately before the time point corresponding to the estimated value, the operation unit may select the approximate final value as the final value.

The device for reducing noise may further includes a noise flag unit that calculates a ratio of outliers among the measurement values measured before a predetermined time based on the time point corresponding to the estimated value, if the ratio of outliers is greater than or equal to a first ratio, the operation unit may select only the candidate final value as the final value; and if the ratio of outliers is less than the first ratio, the operation unit may select an approximate final value as the final value if there is the approximate final value whose residual from the candidate final value is greater than or equal to a third threshold at the time point corresponding to the estimated value, and the operation units selects the candidate final value as the final value if there is no approximate final value.

If there is the approximate final value whose residual from the candidate final value is greater than or equal to the third threshold, and at the same time, there is a second approximate final value that is the measurement value whose residual from a second candidate final value is greater than or equal to the third threshold, the second candidate final value being the measurement value closest within the second range to the estimated value at the time point immediately before the time point corresponding to the estimated value, among the actual measurement values at the time point immediately before the time point corresponding to the estimated value, the operation unit may select the approximate final value as the final value if an absolute value of a slope of a straight line connecting the approximate final value at each time point and the second approximate final value is less than or equal to a second slope, otherwise, the operation unit may select the candidate final value as the final value.

A method for reducing noise of an external measurement sensor of mobility according to the present invention includes the steps of storing measurement values of an external measurement sensor of mobility including an ultrasonic sensor measuring distance values between the mobility and an object outside the mobility, by a storage unit; generating a plurality of functions capable of being derived from the measurement values stored in the storage unit by an operation unit; deriving a final function having the most measurement values within a first range among the plurality of functions by the operation unit; deriving an estimated value that is an expected value of the measurement value through the final function by the operation unit; and selecting, as a final value, a candidate final value that is closest to the estimated value within a second range, among actual measurement values at a time point corresponding to the estimated value, by the operation unit.

According to a device and method for reducing noise of an external measurement sensor of mobility, past data is additionally utilized to reduce the noise of measured current data in measuring the external data of mobility, and at this time, robust current data to an abnormal signal can be output by using the function obtained from the past data measured for a certain time immediately before and the range of the function, and a collision warning or braking device of mobility can be effectively controlled by using this.

BRIEF DESCRIPTION OF THE DRAWINGS

FIG. 4 is a flowchart of a method for reducing noise of an external measurement sensor of mobility according to an embodiment of the present invention.

DETAILED DESCRIPTION OF THE INVENTION

Specific structural or functional descriptions of the embodiments of the present invention disclosed in this specification or application are only exemplified for the purpose of describing the embodiments according to the present invention, and the embodiments according to the present invention may be implemented in various forms and should not be construed as being limited to the embodiments. Hereinafter, the embodiments of present invention will be described in detail with reference to the accompanying drawings.

Figure 1:
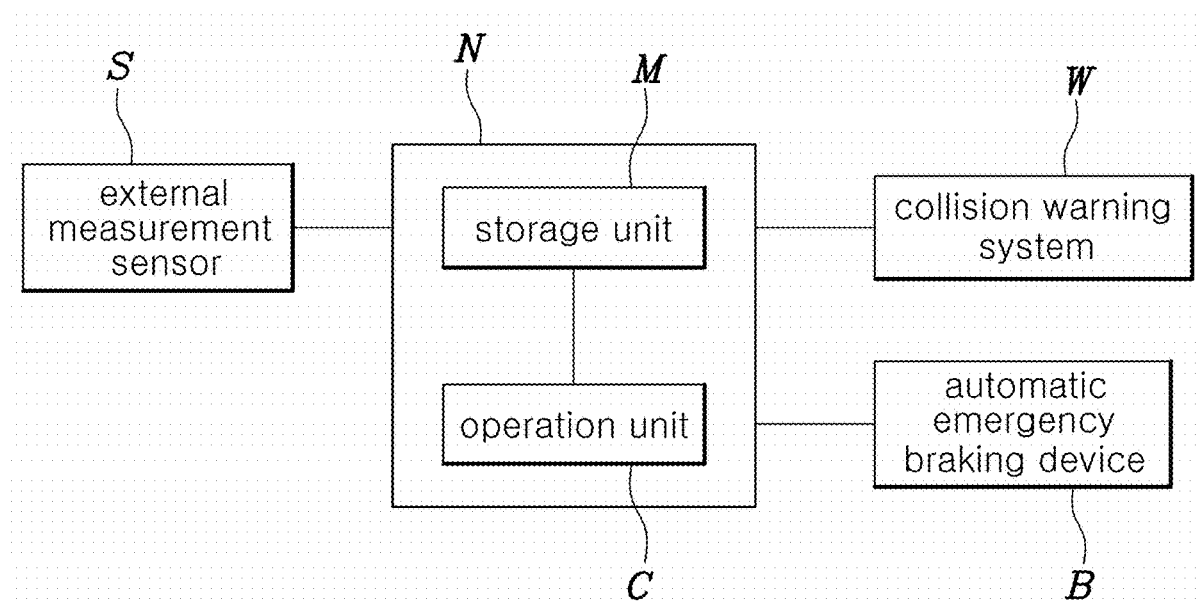
FIG. 1 is a block diagram of a device for reducing noise of an external measurement sensor of mobility according to an embodiment of the present invention.
Figure 2:
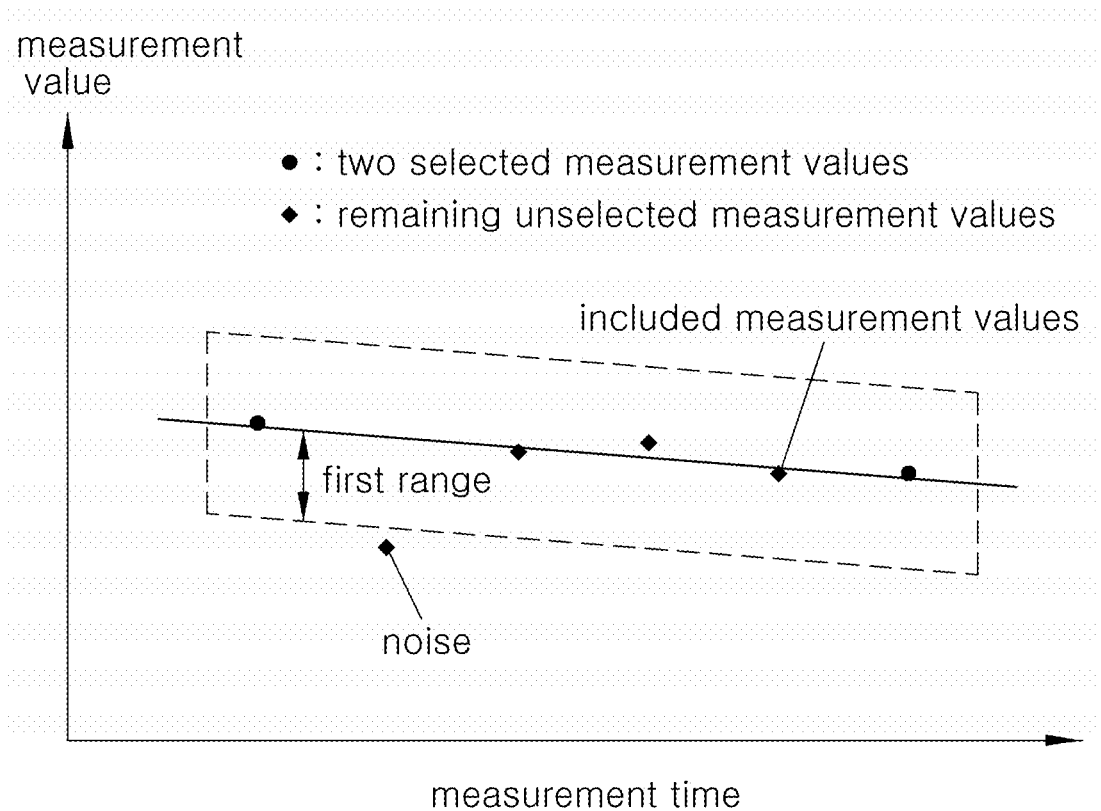
FIGS. 2 to 3 are graphs showing a case in which a device for reducing noise of an external measurement sensor of mobility according to an embodiment of the present invention is applied.
Figure 3:
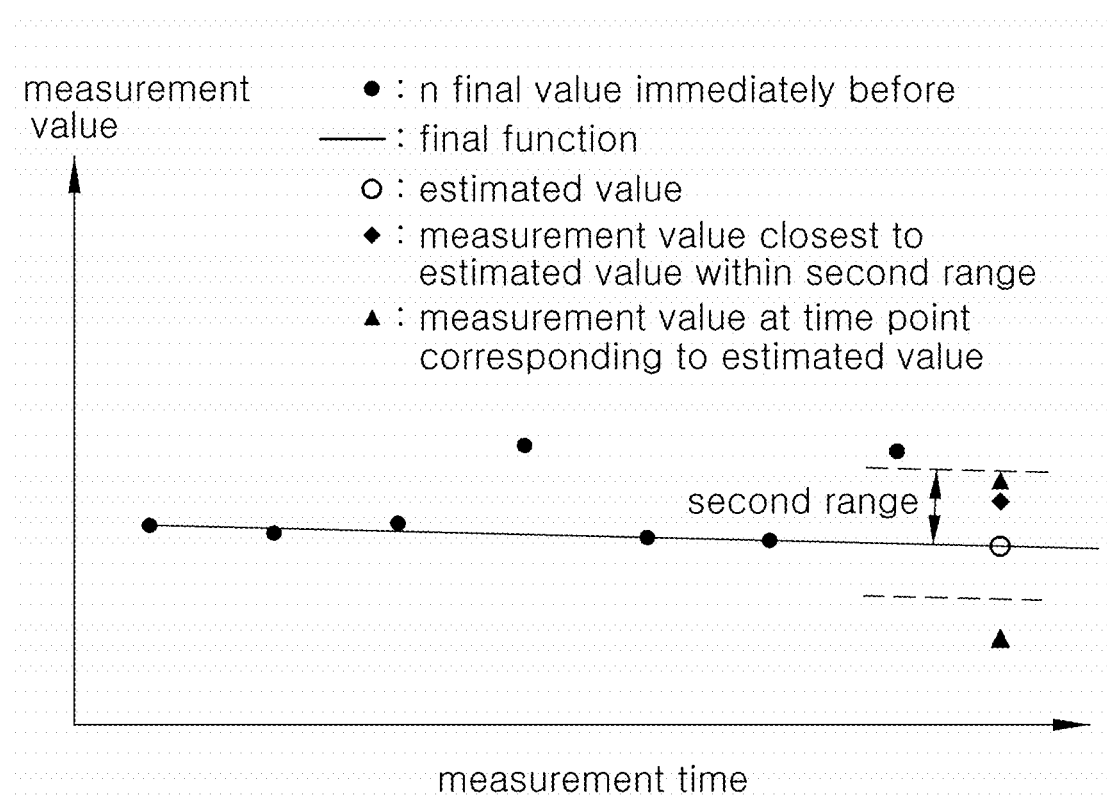

FIG. 1 is a block diagram of a device for reducing noise of an external measurement sensor of mobility according to an embodiment of the present invention, FIGS. 2 to 3 are graphs showing a case in which a device for reducing noise of an external measurement sensor of mobility according to an embodiment of the present invention is applied, and FIG. 4 is a flowchart of a method for reducing noise of an external measurement sensor of mobility according to an embodiment of the present invention.

FIG. 1 is a block diagram of a device for reducing noise of an external measurement sensor of mobility according to an embodiment of the present invention. Here, mobility means vehicles and applications including a means for transportation (including translation, rotation, vibration, and combinations thereof) and a means for flying. The device for reducing noise of mobility is a control device that removes abnormal signals among the physical signals measured or perceived (hereinafter referred to as measurement, etc.) by an internal measurement device or an external measurement sensor of mobility and detects normal signals. Among them, in the case of the device for reducing noise (N) of the external measurement sensor of mobility as in an embodiment of the present invention, the external measurement sensor (S) is installed outside the mobility to measure information on physical quantities or perceive signals from the mobility and the natural world outside the mobility. A storage unit (M) stores the measurement values measured or perceived by the external measurement sensor (S) of mobility. An operation unit (C) performs logic to remove an abnormal signal among the measurement values stored in the storage unit (M) and detects a normal signal.

The normal signal detected by the operation unit (C) means information on the external risk of mobility. In particular, the operation unit (C) will continuously feedback whether a final value corresponds to a set value, range, or error value of each device to be controlled to finally control each device. In particular, if this device is a driving device, braking device, or warning device of mobility, it can be controlled to prepare for the risk of collision, etc. As an example, a collision warning system (W) or automatic emergency braking device (B) of the mobility receives the normal signal detected by the operation unit (C) and determines whether there is a collision risk or emergency braking risk through predetermined processing. Next, the collision warning system (W) of mobility controls whether a warning device such as a warning sound is operated according to whether there is a risk of a front-rear collision or a collision with a ground line, a parking line, and a curb during flight. The automatic emergency braking device (B) of mobility controls whether the braking system is operated according to whether there is a risk of collision or an emergency braking risk such as when the driver of mobility is careless to drive due to drowsiness or cannot control the driving such as sudden acceleration of mobility.

An embodiment of the present invention is a system for removing noise from the measurement values measured through the external measurement sensor of mobility and detecting a normal signal. In particular, the signal measured by the external measurement sensor (S) may be an intensity measured in the x, y, and z directions of sound waves including ultrasonic waves, or light including infrared rays, visible rays, lasers, and radio waves, as the signal generated by the mobility itself or internal and external devices installed in the mobility. Among them, the ultrasonic wave is a sound wave that can be measured through time of flight (TOF) at low cost with respect to a shorter distance among the distances between mobility and obstacles outside the mobility. The time of flight means a value ( $$d = \frac{ct}{2},$$

d is TOF, c is the speed of ultrasonic waves, etc., t is the transmission/reception time) obtained by measuring the time until the ultrasonic wave generated continuously or periodically by the ultrasonic generator installed in the mobility is reflected off an obstacle and received by the ultrasonic receiver of mobility and converting the measurement into a distance. Therefore, in the process of measuring this, there is a very high probability of including noises due to the ultrasonic waves generated at a short distance by the ultrasonic generator of mobility or generated in an external environment.

In particular, an embodiment of the present invention is to remove an abnormal signal, that is, the noise mixed with a measurement value at a current time, and uses, for this purpose, past measurement values before the current time. The conventional system having such a principle removed noises by comparing the estimated value predicted by a trend of past measurement values with the measurement value at the current time. In this case, the conventional system derives one function representing the trend of past measurement values, and in particular utilizes the least mean square (LMS) method as a method of deriving one function.

The least mean square method is a method of deriving one function whose square of residual between a measurement value and a function value is the minimum. However, since the least mean square method is calculated by summing up the least mean square, that is, the square of residual between a faulty signal and a current signal if noises are included in the past measurement values, an incorrect approximation result may be obtained. In particular, since, under the premise that noises exist at a certain rate or more compared to normal signals, the noises are calculated as the square of residual in all cases regardless whether noises exist discretely, sparsely or over a certain period, a predictive value with low accuracy is derived although fast measurement is performed. The collision warning system (W) and automatic emergency braking system (B) of mobility controlled in this way, of course, malfunctions or over-operates, which may interfere with the driving of mobility or cause a risk such as a collision accident with another mobility or between other mobility. Therefore, it is desirable to remove the noises of past measurement values. Accordingly, an embodiment of the present invention is to derive a final value robust to noises through an estimated value evaluated by removing noises from past measurement values. Through this, control of internal and external devices of mobility can be performed quickly and accurately.

FIG. 1 is a block diagram of a device for reducing noise of an external measurement sensor of mobility according to an embodiment of the present invention, including, more specifically, a storage unit (M) that stores measurement values of an external measurement sensor (S) of mobility; and an operation unit (C) that generates a plurality of functions capable of being derived from the measurement values stored in the storage unit (M), derives a final function having the most measurement values within a first range, among the plurality of functions, derives an estimated value that is an expected value of measurement value through the final function, and selects a candidate final value that is the closest to the estimated value within a second range, among actual measurement values at a time point corresponding to the estimated value, as a final value.

In this case, the measurement of the external measurement sensor (S) of mobility includes both the measurement and perception of physical signals such as measuring. The measurement is to measure the signal itself as a measurement value, and the perception is to measure the signal as electrical information (e.g., voltage) accompanied by certain processing such as converting such information into a measurement value. In addition, the external measurement sensor (S) of mobility itself or the storage unit (M) of the device for reducing noise may be designed to measure or store only the physical signal exceeding a certain threshold, rather than measuring or storing all physical signals. In addition, the measurement values may be points, vectors, or a matrix using the points or vectors, and may be continuous or discrete according to a measurement or storage method. The measurement or storage method may be set differently depending on the characteristics of corresponding mobility and external measurement sensor, the type and nature of measurement values, the amount and reliability of normal signal and noise, and the speed and accuracy of a device to be controlled.

In addition, the function derived from the operation unit (C) is a binary relation in which each element of a certain set (domain) is matched to a unique element (range) of another set (codomain). Here, a function includes polynomials, a rational function, an irrational function, an algebraic function including a power function, a periodic function including a trigonometric function, as well as a discrete function capable of having a non-differentiable interval, and an exponential function, its analytic function such as Fourier series, and its composite function and inverse function. Also, the domain of function includes a set of real number or complex number, the function itself, a vector space, a matrix space, and the like. In addition, the type of function derived from the operation unit (C) can be set differently depending on the characteristics of corresponding mobility and external measurement sensor, the type and nature of measurement values, the amount and reliability of normal signal and noise, and the speed and accuracy of a device to be controlled.

What is important here is that an embodiment of the present invention derives a final function for removing the noises of present measurement values by selecting a model having the most normal signals in past measurement values, unlike the least mean square method. In addition, according to an embodiment, the trend of past measurement values is tracked by setting the inclusion criterion to a measurement value within a first range of function value. Accordingly, the derived final function in an embodiment accurately shows the trend of normal signals while removing the noises of past measurement values (under the premise that normal signals are more that noises). With the robust control based on the estimate value and final value accurately predicted in this way, the collision warning system (W) or automatic emergency braking system (B) of mobility can essentially perform the effect of preventing collision accidents.

In addition, according to an embodiment of the present invention, a final function can be derived by detecting normal signals even when noises are included sporadically in past measurement values, as well as when noises are included in past measurement values over a certain time. In order to compensate for the disadvantages of the least mean square method, the conventional system may disclose a technique for recognizing and removing noises as a noise section when noises very different from normal signals are included in a certain section. However, assuming that the past measurement values are measured discretely instead of continuously, since the conventional system cannot measure the accumulated noises over a certain period of time, it is impossible to determine the noises. In addition, if such a determination is applied to the assumed environment, the normal signals for a predetermined section in which sporadic noises are included may be rather determined as noises. However, according to an embodiment of the present invention, the sporadic noises included in past measurement values can also be removed by selecting a model including the most normal signals. Accordingly, an embodiment of the present invention can remove noises regardless of the type, shape, distribution, etc. of noises, and thus provides a more robust noise reduction function than the conventional system.

Here, a first range may be reasonably determined in a range set with a confidence interval of 95% to 99%, assuming that the difference (i.e., residual) between a measurement value and a corresponding function value follows a normal distribution for the reliability of the control. That is, the first range may be set to any one of 1.96 to 2.58 times the square root (i.e., standard deviation) of a value obtained by dividing the sum of squares of residuals by the number of measurement values. Alternatively, the first range may be set up to three times the standard deviation to include normal signals of 99.9% for higher reliability.

More specifically, the storage unit (M) of the device for reducing noise (N) of the external measurement sensor of mobility according to an embodiment of the present invention of FIG. 1 may save the measurement values of the external measurement sensor (S) of mobility measured at regular time intervals. That is, the storage unit (M) may store the measurement values discretely, rather than continuously.

One of the problems to be solved by an embodiment of the present invention is to remove the noises generated by ultrasonic waves generated at a short distance and ultrasonic waves generated in an external environment in measuring the time of flight (TOF) using the ultrasonic generator and receiver of mobility. However, in this case, when the storage unit (M) continuously stores all regardless whether they are noises or normal signals, the operation speed of the operation unit (S) may be very slow due to the amount of excessive measurement values. In addition, the final function and final value derived through the successive numerous measurement values may be desirable in terms of robustness and reliability, but are more undesirable in terms of derivation speed and resulting control environment.

For example, assuming that obstacles appear suddenly and rapidly in the vicinity of mobility, the collision warning system (W) and automatic emergency braking system (B) of mobility must be controlled more quickly in order to prevent the collision risk of mobility and perform emergency braking. In addition, when exposed to external environmental noises for a certain period of time, the collision warning system (W) and automatic emergency braking system (B) of the mobility can perform more precise control operation with the final value processed by measurement and operation at regular time intervals, rather than continuous measurement and operation. Accordingly, the storage unit (M) according to an embodiment of the present invention reduces the amount of operation of the operation unit (C) by storing the measurement values measured at regular time intervals, and thus enables the resulting control to be performed more stably and quickly.

FIG. 2 is a graph showing a case in which a device for reducing noise of an external measurement sensor of mobility according to an embodiment of the present invention is applied. In the device for reducing noise of an external measurement sensor of mobility according to an embodiment of the present invention, the operation unit may select the number of measurement values as many as a first number of elements from the stored measurement values and generate a plurality of functions that can be derived from the selected measurement values. In other words, through a combination of the first number of elements among the plurality of measurement values, the operation unit may generate a corresponding function.

As mentioned earlier, the type and nature of function may be differently set depending on the characteristics of the mobility and external measurement sensor, the type and nature of measurement values, the amount and reliability of normal signals and noises, and the speed and accuracy of a device to be controlled. However, in consideration of one object of an embodiment of the present invention for preventing the collision risk of mobility, the devices to be controlled by the final value of the device for reducing noise need to be controlled more quickly. To this end, it is necessary to reduce the amount of operation of the operation unit, and before the number of functions derived by the operation unit, to set the concept of the first number of elements (hereinafter referred to as r) selected among all the measurement values (hereinafter referred to as n) that derives such a function.

Here, the total number of functions is nCr (C: the number of cases in which the first number of elements is selected among all measurement values regardless of order). However, the sum of combinations of selecting the first number of elements from zero (0) to n as the first number of elements is $2^n$ according to Pascal's triangle and the binomial theorem. That is, if the first number of elements is not determined, the amount of operation of the operation unit increases exponentially according to the number of all measurement values. Accordingly, an embodiment of the present invention reduces the amount of operation of the operation unit to a level of hardware, and accordingly, enables control to be performed more stably and quickly.

In addition, in the device for reducing noise of an external measurement sensor of mobility according to an embodiment of the present invention, the operation unit may select two measurement values among the stored measurement values and generate a plurality of linear functions that can be derived from the selected measurement values. That is, through the combination of a plurality of measurement values, the operation unit may generate a corresponding function, in particular, a function of a straight line connecting two measurement values.

FIG. 2 shows a linear function according to the application of a device for reducing noise of an external measurement sensor of mobility according to an embodiment of the present invention. In FIG. 2, the vertical axis indicates the same measurement value as TOF, and the horizontal axis indicates the measurement time. In particular, it shows the case where an ultrasonic sensor, which is one of the external measurement sensors of mobility, measures TOF at regular time intervals (e.g., 1/60 seconds) of n times, and illustrates the measurement values when a total of six (6) measurements is made. Here, it is assumed that both endpoints of the straight line of FIG. 2, that is, the measurement value immediately preceding and the measurement value of the farthest point are selected based on a current time point. Then, in an embodiment of the present invention, a function of a straight line connecting the two points can be drawn as a linear function. Here, in order to determine whether the remaining four unselected measurement values are normal signals or noise signals, a range within the first range of the function may be set as a boundary line such as a dotted line. After determining points within the boundary line as normal signals and other points as noise, the number of normal signals and corresponding functions are stored, and this process is repeated over and over again. The maximum number of repetitions is $_6C_2$, that is, 15 times, and the number of corresponding straight line functions will also be 15. Then, according to an embodiment of the present invention, one linear function, which is the final function having the most measurement values, will be derived.

As shown in FIG. 2, by setting the first number of elements r as two (2) and generating a linear function accordingly, the amount of operation of the operation unit may be further reduced through the smallest number of functions ($_nC_2$) and a simple function (y=ax+b). In addition, the combination of the two points selected in the above embodiment and the linear function may reflect an arithmetic mean, that is, the average expected value of the remaining unselected points so that the measurement values within the first range may be included.

In addition, the linear function reflects, on average, the motion state within a limited time for measuring the distance between mobility and an obstacle through an ultrasonic sensor and the like. The measurement time when measuring the time of flight (TOF) between sensor-equipped mobility and an obstacle may be very short to achieve purposes such as collision warning or emergency braking. Therefore, assuming that such a limited time is measured, the relative speed between mobility and an obstacle will be constant, that is, a constant velocity motion will be common. Therefore, it is possible to effectively remove the noises included in past measurement values according to general internal and external environments through the arithmetic mean, which is the optimal representative value calculated assuming the above, and its extension value.

On the other hand, FIG. 2 is a graph showing a case in which a device for reducing noise of an external measurement sensor of mobility according to an embodiment of the present invention is applied, and if the number of times the function is generated is greater than or equal to a first threshold times, the operation unit may not generate more functions. In addition, if there is a function in which the number of measurement values within the first range is less than a first threshold, among the plurality of functions, the operation unit of the device for reducing noise according to an embodiment of the present invention excludes the function from a final function and drives the final function having the most measurement values, among the functions in which the number of measurement values is greater than or equal to the first threshold. That is, the range of the final function may be limited by limiting the number of functions up to the first threshold times, or by using only functions in which the number of normal signals is greater than or equal to the first threshold.

As mentioned above, if the number of measurement values as many as the first number of elements is selected, the number of the functions is $$nCr( = \frac{n!}{r!(n-r)!}),$$

that is, an equation for n of (n–r) degree. For example, assuming that r is two (2), the total number of functions is $$\frac{n(n-1)}{2},$$

increasing in a parabolic manner. Accordingly, the number of operation of the operation unit may significantly increase according to the number of measurement values. Accordingly, in one embodiment of the present invention, the control of the device requiring urgency can be smoothly performed by limiting the number of functions up to the first threshold times and deriving the final function within the limited number of functions.

In addition, FIG. 2 is a graph showing a case in which a device for reducing noise of an external measurement sensor of mobility according to an embodiment of the present invention is applied, and if at least one zero (0) is included in the selected measurement values, the operation unit may not generate a plurality of functions from these measurement values. That is, if there is no past measurement value, the operation unit may not generate a plurality of functions from the measured measurement values.

In the device for reducing noise according to an embodiment of the present invention, an amount of operation generated in the process of deriving the final function having the most measurement values within the first range is important in terms of operation speed. In particular, if it is determined that there is not much noise in ae surrounding environment, more rapid control is required for the collision warning system (W) or automatic emergency braking system (B) of mobility. Therefore, an increase in the amount of operation is undesirable in signal processing for the obstacle around the mobility, which is the objective of noise reduction. Therefore, the device for reducing noise according to an embodiment of the present invention reduces the amount of operation by not generating a plurality of functions having the measurement values of zero (0) measured due to surrounding noise, and performs accurate control through rapid signal processing.

In addition, if the absolute value of the slope of the function derived from any two measurement values among the selected measurement values is greater than or equal to a first threshold, the operation unit may not generate a plurality of functions from the measurement values. That is, if the measurement value is TOF, the operation unit may not generate a plurality of functions from the measurement values whose relative velocity is too large.

The device for reducing noise of an external measurement sensor of mobility according to an embodiment of the present invention may process the measurement values measured in relation with the obstacle outside the mobility. In particular, the device for reducing noise according to an embodiment of the present invention may process the measurement values that are measured by processing the relative distance, relative speed, or relative acceleration of obstacle around the mobility through TOF. Assuming that an obstacle approaches mobility (i.e., in a case of negative relative speed), a constant relative speed means that the obstacle approaches at a constant speed, which is measured by the slope of the function. However, even in consideration of the maximum output or maximum speed of mobility, if the absolute value of the corresponding slope is unreasonably large, the measurement values may be determined as noise. Therefore, the device for reducing noise of an external measurement sensor of mobility according to an embodiment of the present invention does not generate a plurality of functions when the absolute value of the slope of the function is greater than or equal to the first threshold, so that the measurement values having a large number of noises are not operated, and thus the operation speed can be improved and quick control can be performed.

As another example, if there is a function in which the number of measurement values within the first range is less than the first threshold, among the plurality of functions, the operation unit of the device for reducing noise according to an embodiment of the present invention excludes the function from the final function, and the operation unit may derive the function having the most measurement values among the functions in which the number of measurement values is greater than or equal to the first threshold. In general, when r elements are selected from at least one function among N functions, as the first threshold times (hereinafter abbreviated as N), the number of times at a level when p, which is the probability of extracting only a normal signal at least once, is 99.9% or more, is preferable for the reliability of control. Assuming an independent trial, the probability of extracting a normal signal when extracting one measurement value is the ratio (hereinafter abbreviated as a) of the number of normal signals among all measurement values. Therefore, the probability of extracting only noise at least once is $1-a^r$, and when iterating with N functions in an independent trial, the probability p of extracting only a normal signal at least once is $1-(1-a^r)^N$. Accordingly, such N can be derived as a natural number greater than or equal to $$\frac{\log(1-p)}{\log(1-a^r)}$$

assuming p greater than or equal to 0.99.

In addition, it is inefficient in terms of the amount of operation and the operation speed to derive the final function after storing all the derived function and the measurement values within the first range. Therefore, the number of measurement values within the first range needs to be filtered within a reliable range. In particular, if the selected measurement values are close to each other, the function derived from the selected measurement values is highly likely to deviate from the reliable number of measurement values. This is true whether or not noises are included in the selected measurement values. Accordingly, in an embodiment of the present invention, the range of the final function is limited to the function in which the number of normal signals is greater than or equal to the first threshold, among the functions derived from such measurement values, so that the amount of operations is reduced to match the level of hardware to be controlled, and accordingly, the control can be performed more stably and quickly.

In addition, the operation unit according to an embodiment of the present invention may not derive the estimated value if there is no function in which the number of measurement values within the first range is greater than or equal to a second threshold, among the plurality of functions. In other words, the minimum ratio of the normal signals among the number of measurement values of the final function (hereinafter referred to as n for convenience) may be set as (the second threshold/n).

As shown in FIG. 2, the device for reducing noise according to an embodiment of the present invention derives the estimated value based on the final function having the most measurement values, compares it with a current measurement value, and selects the closest value as the final value to reduce noise. Therefore, if 50% or more of the measurement values stored in the storage unit are noise, the final function and the estimated value derived therefrom are unreliable even if many measurement values are included. In particular, the measurement values of the ultrasonic sensor are easily affected by temperature fluctuations or wind because the medium is air. Therefore, in an environment in which temperature and wind rapidly flow, most of the measurement values may not be normal signals. Even in this case, it is very dangerous to select the final function and final value to control the collision warning system or automatic emergency braking system of mobility to be operated. Accordingly, according to an embodiment of the present invention, if the number of measurement values is less than the first threshold, the reliability and accuracy of the device for reducing noise are increased by excluding such measurement values from the final function, and thus accurate control is ensured.

On the other hand, in another embodiment of the present invention, if there is a plurality of final functions, the operation unit of FIG. 2 may derive the function having the largest sum of values obtained by multiplying the measurement values within the first range by a first weight that increases as the measurement value is closer to a current time point, as the final function. In addition, the first weight may be the number of measurement values within the first range in the case of the measurement value closest to the current time point, and may be one (1) in the case of the measurement value furthest from the current time point. That is, the final function with a larger number of measurement values close to the current time point can be given priority.

As shown in FIG. 2, the operation unit of the device for reducing noise operates the measurement values immediately before the current time point stored at regular time intervals. In particular, in another embodiment, the ultrasonic time of flight (TOF) of the mobility ultrasonic sensor can be measured as a measurement value, and in this case, only two measurement values are selected among the measurement values to derive a final function and a final value with a plurality of linear functions. However, it is assumed that a linear function (especially in the case of y=ax+b) is a constant velocity motion. That is, it is not assumed that the relative speed between mobility and an obstacle at immediately before the current time point is accelerated or decelerated. Therefore, even if the relative speed increases or decreases, the linear function selects the measurement value closest the straight line, that is, the estimated value and final value derived assuming that the relative speed is constant. However, there is a risk of incapacitating a vehicle dynamic control (VDC), a traction control system (TCS), a limited slip differential (LSD), a collision warning system, an automatic emergency braking system, an anti-braking System (ABS), etc. for preventing the inability of the driving force and direction control of mobility or collision with obstacles. This is because even if the mobility becomes dangerous due to sudden acceleration of the mobility, an obstacle accelerating close to the mobility, or a sudden deceleration or change of direction due to sudden braking of the mobility (i.e., even if the TOF is suddenly approached), the final value in the case of assuming of constant velocity motion is derived, so the control can be already performed one step later.

Therefore, in another embodiment of the present invention, the first weight, which is the deceleration/acceleration factor, is multiplied to derive the function having the largest sum as the final function. Through this, another embodiment can solve the control problem caused by preferentially deriving measurement values of a shape similar to itself, for example, a polynomial function such as a linear function. That is, in another embodiment, it is considered that the TOF may be sharply decreased when further accelerated or further decelerated at the current time point, more than the estimated value that is the expected value of the corresponding function immediately before the current time point. As a result, another embodiment of the present invention can preemptively control a collision avoidance device by selecting an accurate final value even when exposed to a collision risk situation between mobility and an obstacle.

In particular, in another embodiment of the present invention, the first term of the first weight may be the number of measurement values within the first range and the last term of the first weight may be one (1). In this case, the first weight between them may be an arithmetic progression with a common difference of one (1), or a geometric sequence with a common ratio of n square root of (1/n). The latter gives more weight to the measurement values immediately before the current time point than the former. In particular, weights can be assigned differently depending on the mobility's sensitivity to obstacle collisions. However, in another embodiment of the present invention, the predictability of the weight and the resulting final function is increased by setting the reference point to n and one (1), and a control system optimized for mobility can be provided by setting the reference point flexibly according to the acceleration characteristics of mobility and obstacles.

On the other hand, FIG. 2 is a graph showing a case in which a device for reducing noise of an external measurement sensor of mobility according to an embodiment of the present invention is applied, and the operation unit may derive the final function having the smallest sum of squares of residual between the measurement value and corresponding function value as the final function if there is a plurality of final functions. In addition, if there is a plurality of final functions, the operation unit may derive the function having the largest sum of the values obtained by multiplying the measurement values within the first range by the first weight that increases as the measurement value is closer to the current time point, as the final function, and, if the sum is the same, the operation unit may derive the final function having the smallest sum of squares of residual between the measurement value and corresponding function as the final function. That is, the former embodiment determines the priority of the final function by combining the existing least mean square method, and the latter embodiment determines the priority of the final function by taking another embodiment of the present invention as the priority and combining the conventional least mean square method with the latter priority.

In an embodiment of the present invention, the final function may be derived singly because the number of measurement values within the first range is the largest, but the final function may be derived in plurality because the number of measurement values is the same number. In this case in which there is a contest to determine which function to derive among the plurality of final functions, the operation unit may randomly determine the final function, or may determine with priority. However, the priority control method as in the embodiment of the present invention can operate the collision warning system of mobility and the like more rapidly and accurately by providing room for further noise removal.

In addition, in an embodiment of the present invention, the function having the smallest sum of the squares of the residual between the measurement value and the corresponding function value may be derived as the optimal final function. As in the above-mentioned embodiment, for quick control, the operation unit may limit the number of functions that can be derived from the measurement values to less than the first threshold times. Among them, the final function having the most measurement values within the first range may be derived, but this may not be the case with a probability outside the reliability interval. In this case, it is necessary to derive the optimal final function even within the plurality of functions. In this case, even if there is a plurality of final functions, they will be in a state in which noises are almost removed. Thus, in the contention relationship between the final functions, the selection of one of them using the least mean square (LSM) method accurately shows the trend of past measurement values. In particular, the linear least mean square method is operated algebraically (matrix) by synthesizing normal equations, and since it is easily operated with existing programming tools such as matlab, the fastest and most accurate control will be performed. That is, according to an embodiment of the present invention, rather than the control to randomly select one of a plurality of final functions, the collision warning system (W) of mobility can be operated more quickly and accurately through the control to derive the function having the smallest sum of squares of the residual between the measurement value and the corresponding function value, as the optimal final function.

As another example, one embodiment of the present invention may derive the function having the largest sum of the values obtained by multiplying the measurement values within the first range by the first weight that increase as the measurement value is closer to the current time point, as the final function, and if the sum is the same, may derive the function having the smallest sum of squares of the residual between the measurement value and corresponding function value, as the final function. When the measurement value is the time of flight (TOF) of ultrasonic wave, an embodiment preferentially derives the final function for predicting acceleration motion between mobility and an obstacle, and if there are a plurality of functions, performs filtering with the least mean square method. Accordingly, an embodiment of the present invention prioritizes the risk of collision between mobility and an obstacle, and places the final function to which the trend of past measurement values is more accurately reflected as the next priority, so the devices to be controlled can be operated according to their functions and purposes.

On the other hand, in another embodiment of the present invention that converts the prioritization method as described above to the weighting method, the operation unit may derive the function having the largest final function evaluation value obtained by multiplying the number of measurement values within the first range and at least one parameter derived from the measurement values, among the functions in which the number of measurement values is greater than or equal to the first threshold, as a final function. The parameter may be a value obtained by dividing the sum of values obtained by multiplying the measurement value within the first range and the first weight that increases as the measurement value is closer to the current time point by the number of measurement values within the first range, or may be a value obtained by dividing the sum of the squares of the residual between the measurement value within the first range and corresponding function value by the number of measurement values within the first range. That is, the device for reducing noise of an external measurement sensor of mobility according to another embodiment of the present invention derives a final function through the final function evaluation value obtained by multiplying all the average indicators obtained by dividing the above evaluation indicator (the cumulative sum of values multiplied by the first weight, the cumulative sum of the least square values) by the number of measurement values within the first range. Through this, an embodiment of the present invention derives a final function that more accurately reflects the trend of past measurements and the risk of collision between mobility and an obstacle, thereby enabling the optimized operation of the devices to be controlled according to the function and purpose of the devices.

FIG. 3 is a graph showing a case in which a device for reducing noise of an external measurement sensor of mobility according to an embodiment of the present invention is applied. As shown in FIG. 3, the device for reducing noise according to an embodiment of the present invention selects a candidate final value that is a measurement value closest to the estimated value within the second range. However, if there is an approximate final value whose residual from a candidate final value is greater than or equal to a third threshold, among the actual measurement values at a time point corresponding to the estimated value, the operation unit may select the approximate final value as the final value.

If the device to be controlled in an embodiment of the present invention is related to collision prevention or speed deceleration of mobility, even if the measurement value turns out to be noise, it is necessary to give priority to the measurement value over the estimated value in order to preemptively prevent the risk. In particular, when the measurement value is the TOF of ultrasonic wave, it is necessary to detect an obstacle that suddenly appears close to the mobility to preemptively prevent the risk of collision, which will show a much smaller measurement value than the trend of the past measurement values. However, it is undesirable to recognize even noise from devices that continuously generate ultrasonic waves without moving, such as vending machines and parking lot gates, as such obstacles. Accordingly, an embodiment of the present invention gives priority to only the value whose residual from the measurement value closest to the estimated value within the second range is greater than or equal to the third threshold, thereby preemptively detecting obstacles dynamically approaching mobility and effectively controlling the collision prevention device.

Here, the third threshold may be set to a value 20 times or more of a diffraction limit value of a wave source of the external measurement sensor of mobility. In particular, since the external ultrasonic sensor of mobility generally has the frequency band of 40 to 50 kHz and the wavelength is 6.5 to 8.5 mm, the third threshold should be at least twice the corresponding wavelength in order to distinguish noises from normal signals in consideration of resolution. Considering the distinguished range and the ratio of noise (within 10%), the third threshold can be derived at a level at which an embodiment of the present invention can be industrially used. It is apparent that the third threshold can be set again according to the specification of the external measurement sensor of mobility, the type and wavelength of signals, and the resolution improvement according to signal localization.

FIG. 3 shows the concept in an extension of the graph of FIG. 2, and the graph of FIG. 3 illustrates the measurement value closest to the estimated value within the second range according to an embodiment of the present invention. Here, the measurement value on the vertical axis represents the TOF of the external ultrasonic sensor of mobility, and the horizontal axis represents the TOF measurement time. In the embodiment, the final function is derived from a plurality of linear functions derived by selecting two of the seven measurement values immediately before the current time point, and the estimated value (○) at the current time point and the n final values (●) at the immediately before the current time point are illustrated. In the embodiment of FIG. 3, among the measurement values at the time point corresponding to the estimated value (○), the closest measurement value (♦ within the dotted line) among the measurement values (▲ and ♦ within the dotted line) that are close to the second range is selected as a final value.

At the same time, in another embodiment of the present invention, only the approximate final value may be derived as the final value when the approximate values that are measurement values whose residual from the candidate final value is greater than or equal to the third threshold continuously exist. As a result, it is possible to quickly recognize the obstacle closest to mobility (TOF is smaller than the estimated value by more than the third threshold) while suddenly popping out, and to quickly control a device for responding to the risk of collision and the like.

In addition, FIG. 3 is a graph showing a case in which a device for reducing noise of an external measurement sensor of mobility according to an embodiment of the present invention is applied. If there is an approximate final value whose residual from the candidate final value is greater than or equal to the third threshold, and there is a second approximate value that is the measurement value whose residual from a second candidate final value is greater than or equal to the third threshold, the second candidate being the measurement value closest within the second range, to the estimated value at the time immediately before the time point corresponding to the estimated value, among the actual measurement values at the time point immediately before the time point corresponding to the estimated value, the operation unit may select the approximate final value as the final value. In other words, according to an embodiment of the present invention, whether an object is suddenly approaching or noise is suddenly occurring may be checked through continuously acquired measurement values.

The key technology of the device for reducing noise according to an embodiment of the present invention is extracting accurate measurement values among noises, as well as extracting high reliability measurement values. As described above, the measurement value may be the TOF measured by an ultrasonic sensor between mobility and an external obstacle. However, outputting the approximate final value just because there is the approximate final value among the TOFs measured at the current time point may mean that accurate measurement value is extracted from noises, but may not guarantee that the approximate final value has high reliability. The reason is that it is impossible to distinguish whether it is an object that appears suddenly or a noise that occurs suddenly. Therefore, the device for reducing noise according to an embodiment of the present invention prevents unnecessary emergency braking or collision warning caused by sudden noises by selecting the approximate final value as the final value only when the second approximate final value exists. In conclusion, an embodiment of the present invention detects only an object that appears suddenly, and filters other noises through the candidate final value to provide a more reliable measurement value.

FIG. 3 is a graph showing a case in which a device for reducing noise of an external measurement sensor of mobility according to an embodiment of the present invention is applied. The device for reducing noise further includes a noise flag unit that calculate a ratio of outliers among the actual measurement values measured for a predetermined time before deriving the estimated value. The operation unit selects the candidate final value as the final value if the ratio of the outliers calculated by the noise flag unit is greater than or equal to a first ratio. In a case of the ratio of the outliers less than the first ratio, the operation unit selects the approximate final value as the final value only if the approximate final value exists, and otherwise, selects the candidate final value as the final value. That is, in a noisy environment, the candidate final value has priority.

The device for reducing noise according to an embodiment of the present invention outputs robust current data to an abnormal signal by utilizing the function obtained from the past data measured for a certain time immediately before measurement and a range of the function. Therefore, a logic that generates the final function only in an environment where the external mobility sensor is noisy and selects the candidate final value closest to the estimated value as the final value is required. That is, it is necessary to perform a control step of determining whether or not too many outliers are included in the measurement values received for a predetermined time before the control according to the embodiment of the present invention is performed. Therefore, the device for reducing noise of an external measurement device of mobility according to an embodiment of the present invention can perform accurate control by selecting the candidate final value as the final value only if the ratio of the outliers is greater than or equal to the first ratio.

Here, the outlier is a measurement value in which the absolute value of the z value obtained by dividing the value obtained by subtracting the average of the measurement values for a certain time by a standard deviation is greater than or equal to a first reference value (for example, the measurement value that is more than three times the standard deviation from a mean), or a measurement value that is greater than or equal to the first reference value or less than the first reference value based on an upper quartile and a lower quartile, and thus, the outlier can be distinguished from a normal value. In addition, the outlier may be a value filtered through a frequency, such as a low-frequency filter or a high-frequency filter. In addition, the outlier may be distinguished from the normal value through the difference between the waveform or intensity detected by the external mobility sensor and the waveform or intensity of the normal value, or through convolution, Fourier transform, etc., which is an integral value according to time change.

Meanwhile, FIG. 4 is a flowchart of a method for reducing noise of an external measurement sensor of mobility according to an embodiment of the present invention. The method for reducing noise of an external measurement sensor of mobility according to the present invention includes the steps of: storing the measurement values of the external measurement sensor of mobility by the storage unit (S100); generating a plurality of functions capable of being derived from the stored measurement values by the operation unit (S200); deriving the final function having the most measurement values within the first range among the plurality of functions by the operation unit (S300, S400); deriving the estimated value that is the expected value of the measurement value through the final function by the operation unit (S500); and selecting, as a final value, the approximate final value, which is the closest value within a second range, to the estimated value, among the actual measurement values at the time point corresponding to the estimated value by the operation unit (S600).

What is important here is that the method for reducing noise of an external measurement sensor according to an embodiment of the present invention derives the final function removing the noise of current measurement values by selecting a model in which the number of normal signals included in past measurement values is largest, unlike the least mean square method. In addition, in according to an embodiment, the trend of past measurement values is tracked by setting the included criterion to the measurement values within the first range of the function value. Accordingly, the final function derived through an embodiment accurately shows the trend of the normal signals while removing the noises of the past measurement values (under the premise that the number of normal signals is greater than the number of noises). Through this, an embodiment of the present invention can robustly control the collision warning system or automatic emergency braking system of mobility against noises based on the predicted accurate estimated value and the final value. In this way, the collision accident prevention effect of each device can be essentially performed.

The method for reducing noise of an external measurement sensor is a control method for removing abnormal signals from among the physical signals measured by the external measurement sensor and for detecting normal signals. Among them, in the case of the method for reducing noise of an external measurement sensor of mobility as in an embodiment of the present invention, the measurement values measured by the external measurement sensor in the first step are stored (S100). In this case, the measurement value may be the time of flight (TOF) with respect to ultrasonic waves, etc., which may be detected when it is greater than or equal to a threshold of a certain intensity. In addition, in this step, the measurements and the like measured at regular time intervals may be stored.

In the next step, the logic to remove the abnormal signals among the stored measurement values is performed and the normal signals are detected. As such, first, the plurality of functions that can be derived from the stored measurement values is generated (S200). In this step, the function may be generated from the measurement values selected by the first number of elements, among the measurement values. The first number of elements may be two (2), and the function may be a linear function. As a subsequent step, the number of measurement values within the first range, among the measurement values and the like according to the time of the corresponding measurement and the like, is measured with the function value, and is stored together with the corresponding function (S300). The above second step may be repeated as many times as the first threshold times. That is, the function derived from the measurement values with the iteration logic as many as the first threshold times and the number of measurement values within the first range according thereto may be continuously stored. In addition, the function in which the number of measurement values is less than the first threshold, among the number of measurement values, may be excluded without being stored.

In a subsequent step, the function in which the number of the measurement values, among the stored measurement values, is the largest, that is, the function having the most measurement values, is derived as the final function (S400). If there is a plurality of final functions, the function having the largest sum of values obtained by multiplying the measurement values within the first range by the first weight that increases as the measurement value is closer to the current time point may be derived as the final function. In this step, the first weight may be the number of measurement values within the first range in the case of the measurement value closest to the current time point, and may be one (1) in the case of the measurement value farthest from the current time point. Alternatively, the function in which the sum of the squares of the residual between the measurement value and the corresponding function value is smallest may be derived as the final function. As another example, the function having the largest sum of values multiplied by the first weight is derived as the final function, and if the sum is the same, the function having the smallest sum of the squares of the residual between the measurement value and the corresponding function value may be derived as the final function.

In the method for reducing noise of an external measurement sensor of mobility according to an embodiment of the present invention, which applies the first weight in deriving the final function, the final function that predicts an acceleration motion between mobility and an obstacle is first derived when the measurement value is the time of flight (TOF) of the ultrasonic wave. Therefore, in an embodiment of the present invention, by prioritizing the risk of collisions between mobility and an obstacle, it is possible to perform the optimal operation of the device (a vehicle dynamic control (VDC), a traction control system (TCS), a limited slip differential (LSD), a collision warning system, an automatic emergency braking system, an anti-braking System (ABS), etc.) for preventing the inability of the driving force and direction control of mobility or collision risk, according to its function and purpose.

In addition, the method for reducing noise of an external measurement sensor of mobility according to an embodiment of the present invention determines the final function with priority, rather than the conventional method of randomly determining the final function. Accordingly, an embodiment of the present invention provides room for further noise removal, so that a collision warning system of mobility, etc. can be operated more quickly and accurately.

As a next step, the estimated value that is the expected value of the measurement value may be derived through the final function (S500). However, in this step, if there is no function in which the number of measurement values is greater than or equal to the second threshold, among the stored functions, the estimated value may not be derived. As a final step, the value closest to the estimated value within the second range, among the actual measurement values at the time point corresponding to the estimated value, may be selected as the candidate final value (S600). However, in this step, if the approximate final value, which is a measurement value whose residual from the candidate final value is greater than or equal to the third threshold, among the actual measurement values at the time point corresponding to the estimated value, continuously exists, the approximate final value may be selected as the final value.

The present invention relates to a device and method for reducing noise of an external measurement sensor of mobility, and more specifically, to a device and method for reducing noise of an external measurement sensor of mobility in which in measuring external data of mobility, past data is additionally utilized to reduce the noises of measured current data, and the function obtained from the past data measured for a certain time immediately before and the range of the function are used.

The external measurement sensor such as an ultrasonic sensor of mobility, a means of transportation such as a vehicle, is used for collision warning or braking by detecting objects in a vehicle system. The conventional ultrasonic sensor detects a relative distance from an object by emitting an ultrasonic signal (transmission wave) and determining whether the intensity of a signal (received wave) reflected from the object exceeds a specific threshold. Therefore, the conventional noise filtering technology has emerged for the purpose of robustly controlling the abnormal signal by removing various noises included in the received wave. As part of that, the least mean square method is a method for deriving a final function for predicting current data based on the past data measured by the ultrasonic sensor. However, if the abnormal signals are included in the past data, the function is calculated by adding up the squares of the differences between the abnormal signals and the current signals, so an erroneous prediction may be made. In particular, since, under the premise that the noises exist at a certain rate or more compared to the normal signals, the noises are calculated as the square of residual in all cases regardless whether the noises exist discretely, sparsely or over a period, since, the predictive value with low accuracy is derived although fast measurement is performed.

The collision warning system (W) and automatic emergency braking system (B) of mobility to be controlled accordingly malfunction or over-operate, which may interfere with the driving of mobility or cause a risk such as a collision accident with another mobility or between other mobility. Therefore, it is desirable to remove the noises of past measurement values. Accordingly, the device and method for reducing noise of an external measurement sensor of mobility according to an embodiment of the present invention derive the final value robust to noises through the estimated value evaluated by removing the noises of past measurement values. Through this, the internal and external devices of mobility can be controlled quickly and accurately.

Although the present invention has been shown and described with reference to specific embodiments, it will be apparent to those of ordinary skill in the art that the present invention can be variously improved and changed without departing from the spirit of the present invention provided by the following claims.

DESCRIPTION OF REFERENCE NUMERALS

B: automatic emergency braking devi
N: device for reducing noise
C: operation unit
S: external measurement sensor
M: storage unit
W: collision warning system

What is claimed is:

1. A device for reducing noise of an external measurement sensor of mobility including an ultrasonic sensor comprising:
   a storage unit that stores measurement values of the external measurement sensor measuring distance values between the mobility and an object outside the mobility; and
   an operation unit that generates a plurality of functions capable of being derived from the measurement values stored in the storage unit, derives a final function having the most measurement values within a first range, among the plurality of functions, derives an estimated value that is an expected value of the measurement value through the final function, and selects as a final value a candidate final value that is closest to the estimated value within a second range, among actual measurement values at a time point corresponding to the estimated value.

2. The device for reducing noise according to claim 1, wherein the storage unit stores the measurement values of the external measurement sensor measured at regular time intervals.

3. The device for reducing noise according to claim 1, wherein the operation unit selects a first number of the measurement values among the stored measurement values and generates the plurality of functions capable of being derived from the selected measurement values.

4. The device for reducing noise according to claim 1, wherein the operation unit selects two measurement values among the stored measurement values and generates a plurality of linear functions capable of being derived from the selected measurement values.

5. The device for reducing noise according to claim 1, wherein the operation unit stops generating the plurality of functions when a number of functions generated is greater than or equal to a first threshold.

6. The device for reducing noise according to claim 1, wherein the operation unit does not generate the plurality of functions from the measurement values if one or more of selected measurement values is zero.

7. The device for reducing noise according to claim 1, wherein the operation unit does not generate the plurality of functions from the measurement values if an absolute value of a slope of the function derived from any two measurement values among selected measurement values is greater than or equal to a first threshold.

8. The device for reducing noise according to claim 1, wherein the operation unit excludes from the final function the function in which a number of measurement values is less than a first threshold, and derives the final function having the most measurement values, among the functions in which the number of measurement values is greater than or equal to the first threshold.

9. The device for reducing noise according to claim 1, wherein the operation unit does not derive the estimated value if there is no function in which a number of measurement values within the first range is greater than or equal to a threshold.

10. The device for reducing noise according to claim 1, wherein if there is a plurality of final functions, the operation unit derives as the final function the function having a largest sum of values obtained by multiplying the measurement value within the first range by a first weight that increases as the measurement value is closer to a current time point.

11. The device for reducing noise according to claim 10, wherein the first weight is a number of measurement values within the first range when the measurement value is closest to the current time point, and the first weight is one when the measurement value is farthest from the current time point.

12. The device for reducing noise according to claim 1, wherein if there is a plurality of final functions, the operation unit derives as the final function the function having a smallest sum of squares of residuals between the measurement value and the corresponding function value.

13. The device for reducing noise according to claim 1, wherein if there is a plurality of final functions, the operation unit derives as the final function the function having a largest sum of values obtained by multiplying the measurement value within the first range by a first weight that increases as the measurement value is closer to a current time point, and if the sums are equal, the operation unit derives as the final function the function having a smallest sum of squares of residual between the measurement value and the corresponding function value.

14. The device for reducing noise according to claim 1, wherein if there is an approximate final value that is an actual measurement value whose residual from the candidate final value is greater than or equal to a threshold at the time point corresponding to the estimated value, the operation unit selects the approximate final value as the final value.

15. The device for reducing noise according to claim 14, wherein if the approximate final value whose residual from the candidate final value is greater than or equal to the threshold, and at a same time, there is a second approximate final value that is the measurement value whose residual from a second candidate final value is greater than or equal to the threshold, the second candidate final value being the measurement value closest within the second range to the estimated value at the time point immediately before the time point corresponding to the estimated value, among the actual measurement values at the time point immediately before the time point corresponding to the estimated value, the operation unit selects the approximate final value as the final value.

16. The device for reducing noise according to claim 1, further comprising a noise flag unit that calculates a ratio of outliers among the measurement values measured before a predetermined time based on the time point corresponding to the estimated value, wherein if the ratio of outliers is greater than or equal to a first ratio, the operation unit selects only the candidate final value as the final value; and if the ratio of outliers is less than the first ratio, the operation unit selects an approximate final value as the final value if there is the approximate final value whose residual from the candidate final value is greater than or equal to a threshold at the time point corresponding to the estimated value, and the operation units selects the candidate final value as the final value if there is no approximate final value.

17. The device for reducing noise according to claim 16, wherein if there is the approximate final value whose residual from the candidate final value is greater than or equal to the third threshold, and at a same time, there is a second approximate final value that is the measurement value whose residual from a second candidate final value is greater than or equal to the third threshold, the second candidate final value being the measurement value closest within the second range to the estimated value at the time point immediately before the time point corresponding to the estimated value, among the actual measurement values at the time point immediately before the time point corresponding to the estimated value, the operation unit selects the approximate final value as the final value if an absolute value of a slope of a straight line connecting the approximate final value at each time point and the second approximate final value is less than or equal to a second slope, otherwise, the operation unit selects the candidate final value as the final value.

18. A method for reducing noise of an external measurement sensor of mobility including an ultrasonic sensor, said method comprising:
    storing, in a storage unit, measurement values of the external measurement sensor measuring distance values between the mobility and an object outside the mobility;
    generating, by an operation unit, a plurality of functions capable of being derived from the measurement values stored in the storage unit;
    deriving, by the operation unit, a final function having the most measurement values within a first range among the plurality of functions;
    deriving, by the operation unit, an estimated value that is an expected value of the measurement value through the final function; and
    selecting, by the operation unit and as a final value, a candidate final value that is closest to the estimated value within a second range, among actual measurement values at a time point corresponding to the estimated value.

* * * * *